(12) United States Patent
Barber

(10) Patent No.: US 6,280,039 B1
(45) Date of Patent: Aug. 28, 2001

(54) SCRIPT PROMPT DEVICE

(76) Inventor: Edward N. Barber, 12006 Highwater Rd., Granada Hills, CA (US) 91344

(*) Notice: Subject to any disclaimer, the term of this patent is extended or adjusted under 35 U.S.C. 154(b) by 0 days.

(21) Appl. No.: 09/406,914

(22) Filed: Sep. 24, 1999

(51) Int. Cl.[7] .................................................. G03B 21/00
(52) U.S. Cl. .......................................... 353/119; 348/375
(58) Field of Search ..................................... 353/119, 122, 353/103, 113; 348/61, 373, 375

(56) References Cited

U.S. PATENT DOCUMENTS

| | | | |
|---|---|---|---|
| 4,894,722 | * | 1/1990 | Suzuki . |
| 5,373,333 | * | 12/1994 | Kawada et al. ...................... 353/122 |
| 5,386,227 | * | 1/1995 | Zeper ...................................... 348/61 |
| 5,477,282 | * | 12/1995 | Moore .................................. 353/122 |
| 5,721,586 | * | 2/1998 | Shimamura et al. ................... 348/61 |
| 5,790,194 | * | 8/1998 | Shimamura ........................... 348/375 |

* cited by examiner

Primary Examiner—William Dowling
(74) Attorney, Agent, or Firm—Colin P. Abrahams

(57) ABSTRACT

A script prompter for attachment to a lens of a camera comprises a two-way mirror having a front surface and a rear surface. A hood is mounted on the rear surface of the mirror and defines with the rear surface a chamber through which light can pass to and from the lens of the camera. A connecting member on the hood connects the script prompt device to the lens of the camera. The script prompter includes a script tray member which is attached to the mirror. The script tray is movable relative to the mirror between an open position where the script tray member is angled with respect to the mirror and a closed position where the script tray member and mirror lie adjacent to each other. In this way, text located on or in the script tray member is reflected in the mirror so as to be visible to a person viewed through the lens.

24 Claims, 3 Drawing Sheets

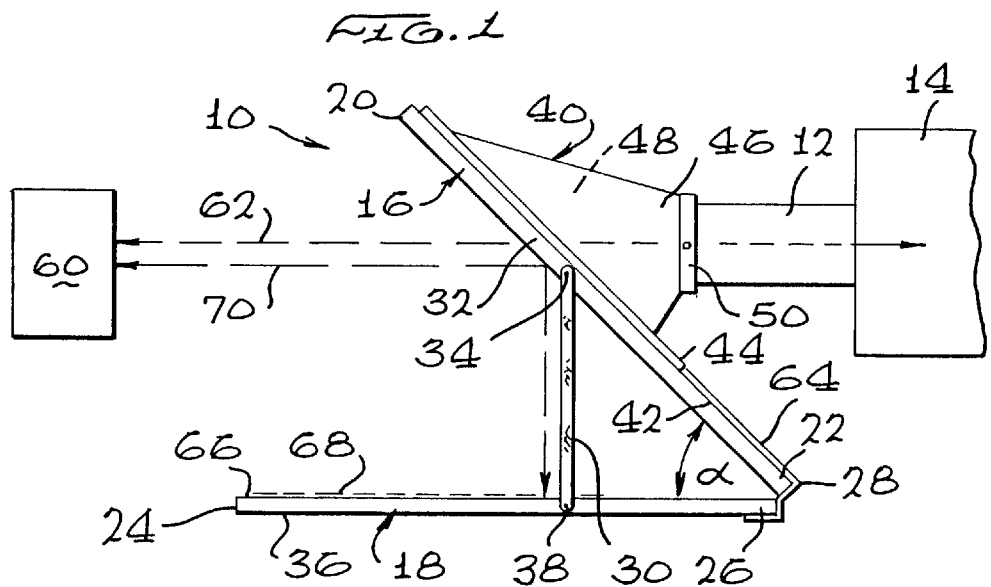
FIG. 1
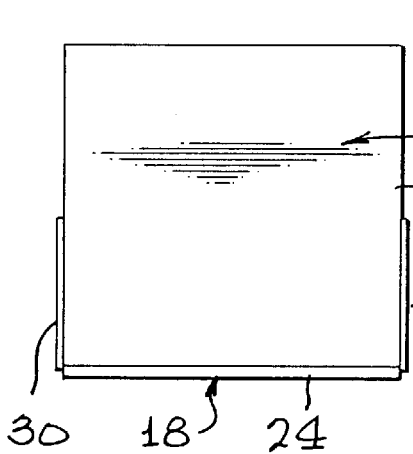
FIG. 2
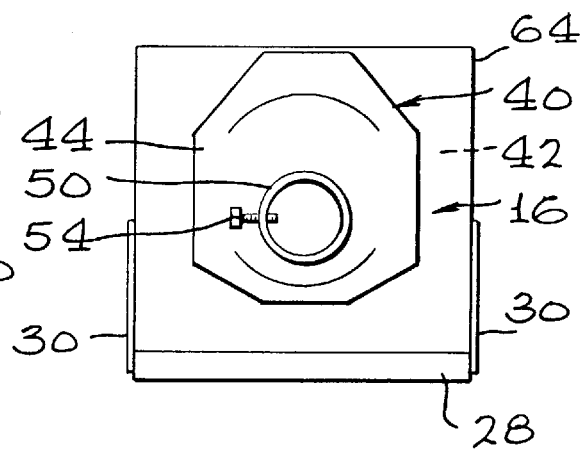
FIG. 3
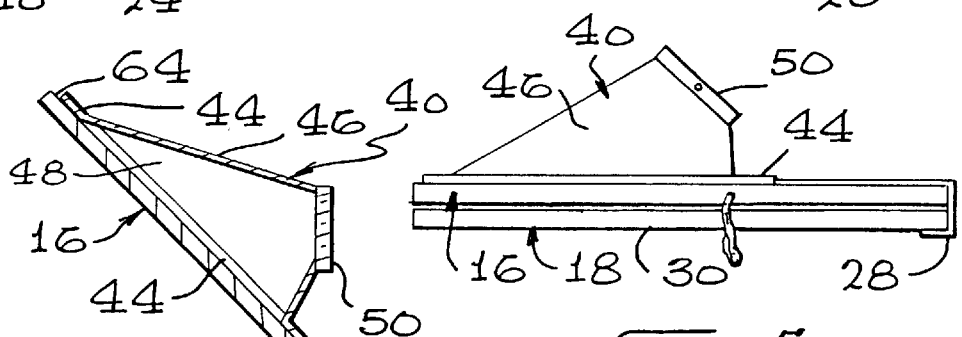
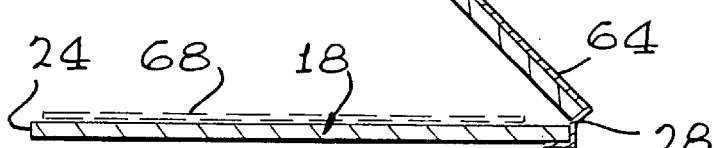
FIG. 4
FIG. 5

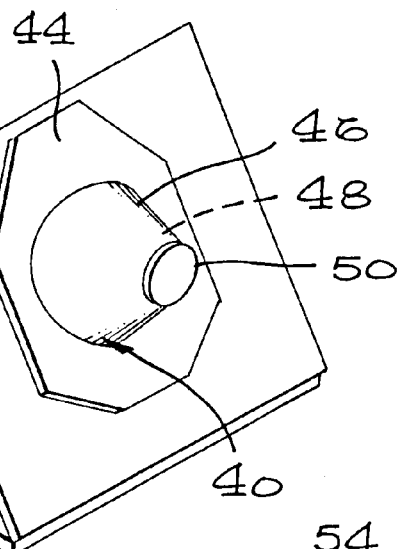
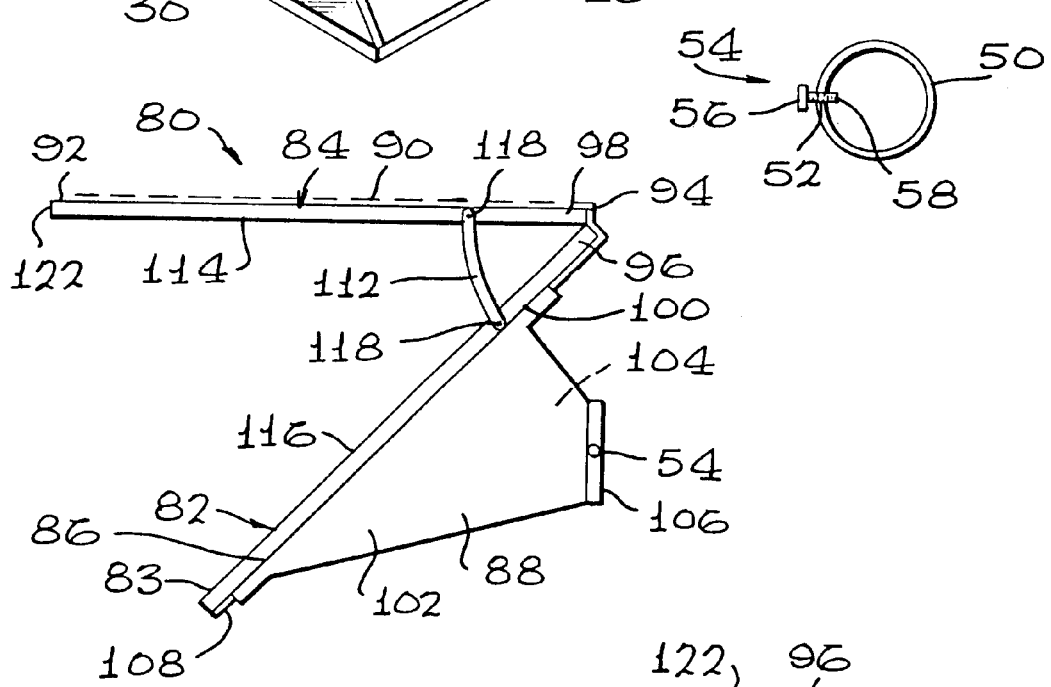
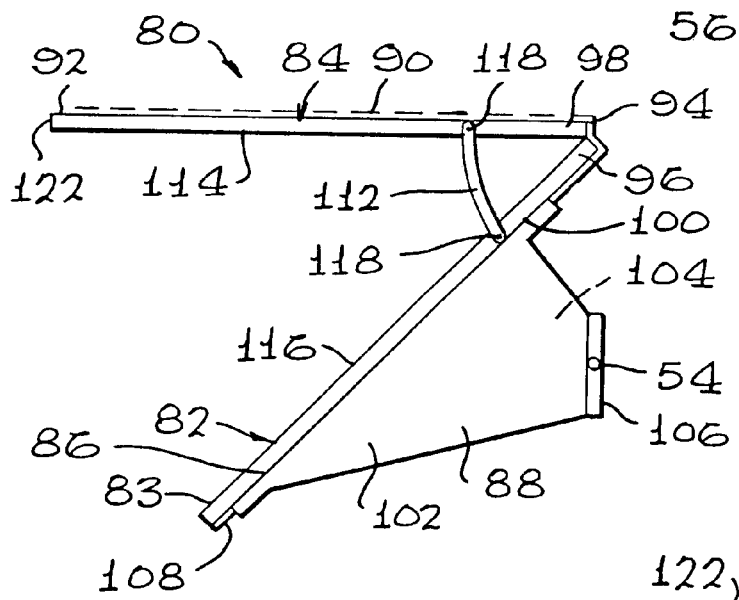
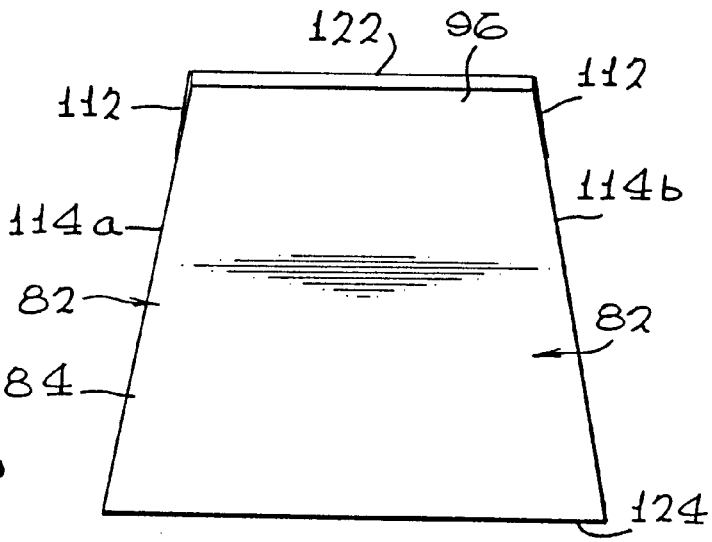

SCRIPT PROMPT DEVICE

FIELD AND BACKGROUND OF THE INVENTION

This invention relates to script prompt devices, and particularly those which are used in association with video cameras. The script prompt device of the invention is a light-weight, portable and inexpensive prompt device which can be easily attached to and removed from a camera lens with which it may be associated.

Teleprompters, or prompting mechanisms associated with video and film cameras, are well-known accessories and commonly used by actors, news readers, news reporters and other personal reading off prepared information and documents while being shot by the camera. These teleprompter systems comprise a portion which attaches to a camera lens, including a mirror with hood, associated with a monitor located at the angle thereto, so that a person standing in front of the camera is able to view the image displayed on the monitor in the mirror. The mirror is, conventionally, a two-way mirror, thus enabling the lens behind the mirror to capture images on the other side thereof.

The monitor is typically attached to the mirror and hood, but, due to its weight, is incapable of being supported by the lens. Therefore, in most known applications, the monitor would be firmly attached to a pedestal, bracket, or other support independent of the lens and mounted separately from the lens so that it can be fully and stably supported.

The monitor in such teleprompters is typically attached to a power source, as well as a computer into which the text to be read by the reader in front of the camera is displayed. As the text is displayed on the monitor, it can be read through the reflected image on the mirror mounted on the lens, and at an appropriate angle to the monitor screen. The text, which should be in inverted or reverse script, is scrolled up and down along the monitor as the reader reads through the information.

In conventional teleprompters, the mirror has on one side thereof the hood or housing which defines a chamber. The housing fits onto the end of the lens of the camera. When attached to the lens, the chamber defined by the housing and mirror is essentially sealed to light, and the only light permitted to enter the chamber, and hence the lens of the camera, is that which passes through the two-way mirror. This comprises the image of the objects at which the lens is directed.

As mentioned above, prompters associated with television cameras currently in use are large and heavy devices, and usually weigh between 9 and 75 pounds. Since they are very cumbersome and complex to set up, a considerable amount of time needs to be devoted to the attachment and setup of the prompter, requiring technicians, operators and special support equipment which are necessary to ensure the proper operation of the teleprompter.

While the cumbersome teleprompters described above can be set up on a permanent basis within televisions studios, and there is little difficulty in such studios in providing the necessary pedestals, brackets and support means, as well as the requisite technicians, the situation is very different where news reports and documentaries are being shot in the field, where the facilities and technology found in a television sound studio are absent. It must be understood that considerable time needs to be set aside for the assembly of the camera and teleprompter equipment, which may waste critical time in providing breaking news reports.

The cost of conventional teleprompter equipment is also relatively high. Thus, replacement thereof is expensive, and such replacement may be necessary more frequently on account of external conditions which may damage or shorten the life of the equipment. Expensive packing and protective equipment may also be essential to preserve this expensive equipment.

SUMMARY OF THE INVENTION

It is therefore one aspect of the invention to provide a script prompter, particularly one which is used in a non-studio setting (although studio use is certainly within the ambit of the invention), which is light-weight, compact, inexpensive, and highly effective in attaching to the lens of a camera in very short periods of time.

In a preferred form, the script prompter device of the invention is a composite unit comprising a mirror with a hood on one side, and a script tray or surface which is attached to it, the mirror forming part of a unit which is easily attached to a lens on a camera.

The script prompt device of the invention is portable, light-weight and can be easily attached to a camera lens by non-technical personal, and text to be read by the reader can be simply loaded and removed onto the tray where no complicated loading requirements are necessary, and eithesr word-processed or hand-written text can easily be used.

According to one aspect of the invention, there is provided a script prompt device for attachment to a lens of a camera, the device comprising: a two-way mirror having a front surface and a rear surface; a hood mounted on the rear surface of the mirror and defining therewith a chamber through which light can pass to and from the lens of the camera; a connecting member on the hood for connecting the script prompt device to the lens of the camera; a script tray member attached to the mirror and movable relative thereto between an open position where the script tray member is angled with respect to the mirror and a substantially closed position where the script tray member and mirror lie substantially adjacent to each other, wherein in the open position text located on or in the script tray member is reflected in the mirror so as to be visible to a person viewed through the lens. Preferably, the open position is adjustable between limits.

According to another aspect of the invention, there is provided a method of displaying text script to a person located in front of a camera having a lens, the method comprising: attaching a two way mirror to the lens or adjacent component of a camera; connecting a script tray to the mirror so as to be fully supported thereby; and orienting the script tray relative to the mirror so that text located on or in the script tray member is reflected in the mirror to be visible to the person viewed through the lens.

BRIEF DESCRIPTION OF THE DRAWINGS

FIG. 1 is a side view of the script prompt device of the invention, shown attached to the lens of the camera;

FIG. 2 is a front view of the script prompt device shown in FIG. 1;

FIG. 3 is a rear view of the script prompt device shown in FIG. 1 (but not attached to the lens of the camera);

FIG. 4 is a cross-section through the script prompt device shown in FIG. 1 (also no longer attached to the camera);

FIG. 5 shows the script prompt device of FIG. 1 in the folded or compacted position;

FIG. 6 is a perspective view of the script prompt device generally shown in FIG. 1;

FIG. 7 is a side view of a second embodiment of the script prompt device of the invention;

FIG. 8 is a detailed schematic view showing the lens ring, and the mechanism for attachment to the lens;

FIG. 9 is a front view of the script prompt device shown in FIG. 7;

DETAILED DESCRIPTION OF THE PREFERRED EMBODIMENTS

Figure 10:
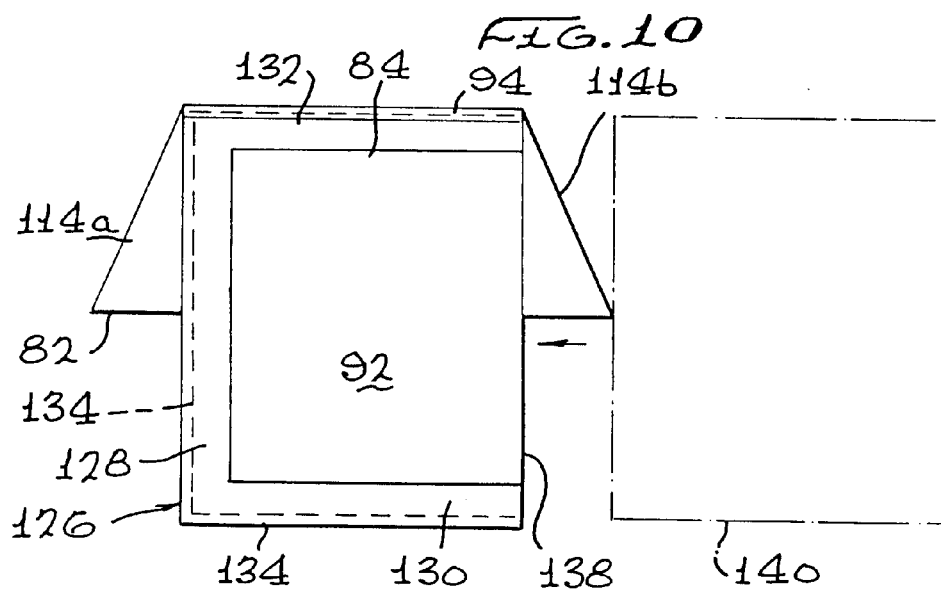
FIG. 10 is a top view of the script prompt device shown in FIG. 7, with certain additional features illustrated.

Reference is now made to the accompanying drawings which show various features and embodiments of the script prompt device of the invention.

In FIG. 1, there is shown a script prompter 10, shown attached to the lens 12 of a camera 14, both of which are shown in schematic form only. The script prompter 10 comprises a two-way mirror 16 attached to a script tray 18, upon which a transparency or other sheet of paper having the text to be read is contained or mounted. The two-way mirror 16, preferably comprised of plastic, permits light to flow through it in both directions. Light passing through the two-way mirror 16 will, to a certain extent be filtered, but the reduction in the amount of light resulting from passage through the two-way mirror would be within acceptable limits and, most importantly, will not affect the quality of the image passing into the lens 12, and into the camera 14. When the script prompter 10 is used in reasonably bright light outdoors, the amount of light reduction by virtue of the two-way mirror 16 would in normal circumstances amount to no more than that provided by conventional filters which would be attached to the lens of the camera. In darker or indoor conditions, the amount of light reduction caused due to passage through the mirror can easily be compensated for by adjusting the lens by a few stops, to enlarge the diaphragm opening of the lens.

The script tray 18 is preferably comprised of a light plastics or cardboard material, and would preferably be colored white so as to enhance the contrast between the script tray and darker print, facilitating the reading of the text.

The two-way mirror 16 has an outer end 20 and an inner end 22. The script tray 18 has an outer end 24 and an inner end 26. The inner end 22 of the mirror 16 is hingedly attached to the inner end 26 of the script tray 18, thereby permitting relative movement between the mirror 16 and script tray 18 between an open position (illustrated in FIG. 1) and a closed or compact position (shown in FIG. 5 of the drawings). A hinge 28 joins inner ends 22 and 26 so as to permit these ends to pivot with respect to each other, allowing movement between the open and closed positions.

A limit bracket 30 extends between the mirror 16 and script tray 18 to restrict the amount of opening permitted between these two components. The limit bracket 30, which may be comprised of a flexible length of fabric or other material, or comprise a foldable metal strip, is attached to the side edge 32 of the script prompter 10 by a pin 34, and to the side edge 36 of the script tray by a pin 38. In normal circumstances, the length of the limit bracket 30 will be selected so that the angle α between the mirror 16 and script tray 18, when in the open position, is ideal for the purposes of the reader best being able to discern the text.

In the embodiment shown in FIG. 1, the hinge 28 comprises one or more strips of fabric, plastic, canvas or other material glued to the mirror 16 and script tray 18 at the inner ends 22 and 26 respectively. The fabric is flexible, so that, at the same time, it permits pivoting of the components relative to each other, but also firmly holds them together.

A hood or housing 40 is mounted on the outer surface 42 of the two-way mirror 16. The hood 40 comprises a flat peripheral rim 44, and a housing wall 46 which, when mounted on the mirror 16 defines a chamber 48. Except as described below, the chamber 48 is light-sealed so that light can only enter the chamber 48 through predetermined pathways.

The hood 40 terminates at a lens ring 50 at an end thereof, the lens ring 50 having a diameter which enables it to fit over the lens 12 of the camera 14. The lens ring 50, also illustrated in FIG. 8 of the drawings, has a tightening mechanism for firmly securing the script prompter 10 onto the lens 12. The lens ring 50 has a threaded hole or aperture 52 which receives a bolt 54 including a head 56 and a male threaded portion 58. The male threaded portion 58 is received within the threaded aperture 52. When the lens ring 50 is mounted over the lens 12 of the camera, the bolt 54 is rotated so that the threaded portion 58 moves into and engages the lens 12. The head 56 can be turned sufficiently so as to accomplish the necessary degree of tightness to both hold the script prompter 10 on the lens 12, and to ensure that it does not rotate or shift thereon.

With the script prompter 10 mounted on the lens 12, light is able to travel from a person or object being shot, indicated by reference numeral 60, through the lens 12 and into the camera 14, as represented by the line 62. The camera operator in a through-the-lens viewing camera observes the person 60 through the lens, the chamber 48, and the two-way mirror 16. Further, light from the person 60 moves in the direction of light 62, passes through the two-way mirror 16, into the chamber 48, lens and camera, where the image is electronically, digitally or otherwise recorded.

The outer surface 42 of the two-way mirror 16 has an opaque coating 64 over those portions not covered by the hood 40. This prevents light from travelling through the two-way mirror 16 at these areas, where it is not necessary for the light to pass through the mirror 16.

While light is allowed to enter the camera 14 from the object or persons 60, as described above, the script prompter 10 also permits the person 60 to read off text on a transparency or paper sheet, which is resting on the upper surface 66 of the script tray 18. The text on the transparency or sheet, designated by reference numeral 68 is reflected in the two-way mirror 16, and can be seen by the person 60. This light pathway of the text on the sheet 68 is represented by line 70 extending between the person 60 and the sheet 68. The sheet 68 obviously contains a given amount of space, and the amount of information which the person 60 will be able to read off the sheet is obviously limited by the size of the sheet 68. Where the person 60 is further away from the camera, the text on the sheet 68 will have to be larger, whereas smaller text will be appropriate where the person 60 is standing more closely to the camera. The sheet 68, however, can very easily be moved off the upper surface 66 of the script tray 18, and replaced with the next sheet, on an as needed basis.

The angle α between the script tray 18 and the mirror 16, when in the open position, is important in optimizing the amount of reflected text on the sheet 68 to the person 60. Depending on the circumstances, this angle a may preferably fall within the range of 40° to 60°. For many purposes, it has been found that an angle of about α=55° is optimal.

In FIG. 2 of the drawings, a front view of the script prompter 10 shown in FIG. 1 is illustrated. FIG. 2 shows the mirror 16, and the outer end 24 of the script tray 18. The two limit brackets 30 are clearly shown in this drawing. FIG. 3 is a rear view of the script prompter 10 shown in FIG. 1, showing the opaque coating 64 on the outer surface 42 of the mirror 16, as well as the hood 40 including the rim thereof 44. The lens ring 50 can be seen, as well as the bolt 54 used for securing the script prompter 10 securely to the lens 12. The hinge 28 connects the mirror 16 and the script tray 18, while the limit brackets 30 restrict and determine the angle α between these two components.

With reference to FIG. 4, there is shown the cross-section through the script prompter 10 shown in FIG. 1. This Figure clearly shows the chamber 48 defined by the hood 40 and the mirror 16. The opaque coating 64 is also illustrated, preventing the passage of light through the mirror 16 at those points over which the hood is not mounted.

As mentioned, the script prompter 10 of the invention is collapsible, and can be compacted into a closed position for easy storage and transport, as is illustrated in FIG. 5 of the drawings. When the script prompter 10 is attached to the lens by means of the lens ring 50, the mirror 16 is held at an angle, and the gravitational forces acting on the script tray 18 will cause it to move automatically to the open position. The extent of opening is, as mentioned, limited by the limit bracket 30.

Reference is now made to FIG. 7 of the drawings which shows a second embodiment of the invention. In FIG. 7, there is shown a script prompter 80 including a two-way mirror 82 and a script tray 84 which is transparent. The mirror 82 has a front surface 83 and rear surface 86. A hood 88 is attached to the rear surface 86 of the mirror 82.

One of the significant differences between the script prompt devices 10 and 80 in FIGS. 1 and 7 respectively is that, in FIG. 7, the script tray 84 is located above the mirror 82, while in FIG. 1, it hangs below the level of the mirror. The mirror 82 includes a front surface 84 and a rear surface 86, and a hood 88 is attached to the rear surface 86 of the mirror 82 in much the same way as shown with respect to FIG. 1. However, as will be noted from the illustrations, the angle of the mirror 82 in FIG. 7 is moved through about 90°, in order that the script tray 84 can be mounted to it, so as to be held approximately horizontally when in use, in the open position.

There may be several advantages associated with a script tray 84 which is above the level of the mirror 82, as illustrated in FIG. 7. First, it should be noted that the script tray 84 is essentially transparent to light. It is therefore made up of a clear glass or plastic material. The text page, indicated by reference numeral 90, is mounted on the upper surface 92 of the script tray, and rests thereon while text on the page is being read. Clearly, a script tray 84 comprised of an opaque material would be inappropriate in the circumstances, since the reader would not then be able to see the text on the page 90.

Another advantage of the script tray 84 being mounted so as to be above the mirror 82 is the ease with which the text page 90 can be inserted and removed from the upper surface 92 of the script tray 84, especially without interfering with the image being recorded on the camera. Thus, a person removing and/or replacing the text page 90 on the upper surface 92 of the script tray 84 during shooting would be less likely to have his hand cross the path of the camera lens, between the camera and the person being filmed. Yet another significant advantage of the raised script tray 84 is that any light, whether outside natural light or that provided by lighting equipment on or above a camera, would tend to shine downwardly on the text, and be reflected by the mirror to provide better contrast. This lighting of the text therefore substantially facilitates the reading thereof by the person being shot.

The mirror 82 and script tray 84 are held together by a hinge 94, which can be much the same as that shown in FIG. 1 of the drawings. Thus, the hinge extends at least partially along an inner edge 96 of the mirror, and an inner edge 98 of the script tray 84, holding them together so that they can pivot relative to each other, and move between an open position, shown in FIG. 7, and a closed position, not shown for the second embodiment, but otherwise very similar to that illustrated in FIG. 5 of the drawings. The hinge 94 may be of different types, further details and examples of which are described below.

The hood 88 includes a rim 100 and a housing wall 102, which together define a chamber 104 formed by the hood 88 and the rear surface 86 of the mirror 82. A lens ring 106 is provided on the hood 88, and this attaches to the lens of a camera in a similar manner to that described with reference to FIG. 1 of the drawings. The lens ring 106 has a threaded aperture 52 (see FIG. 8) and a bolt 54 which can be tightened and loosened within the threaded aperture 52 so that the script prompter 80 can be firmly and stably mounted to the lens of the camera. As was the case with respect to the embodiment shown in FIG. 1, an opaque coating 108 is provided on the rear surface 86 of the mirror 82 at those points not covered by the hood 88.

In the script prompter 80 shown in FIG. 7, a rigid limit bracket 112 is provided. The limit bracket 112 extends between side edge 114 of the script tray 84 and side edge 116 of the mirror 82. Each end 118 of the rigid limit bracket is attached by a screw, nail or other appropriate fastening means to the side edges 114 and 116 of the script tray 84 and mirror 82 respectively.

In the embodiment in FIG. 1, the limit bracket 30 could be flexible, and was mounted on the script prompter 10 for the purposes of restricting the extent of opening between the mirror and the script tray. In the embodiment in FIG. 1, since the script tray was effectively below the mirror, and the mirror was attached to the lens, the script tray would automatically open by the forces of gravity to the extent that the limit bracket 30 would permit. This situation is, of course otherwise in the embodiment shown in FIG. 7. Since the script tray 84 is located above the mirror, it is necessary that the script tray be effectively held in place by a rigid bracket 112 (or other means, such as a hinge, described below) so as to retain it in its substantially horizontal position shown in FIG. 7.

When the script prompter 80 is folded into its compacted position, the rigid limit bracket 112 can be adjusted or released to permit folding. This can be achieved in any one of a number of conventional ways, and there are many examples of brackets which may effectively operate in this situation. Thus, the bracket 112 could be hinged along its length and clamped into the open position. At the time for folding or compacting the script prompter, the clamp is simply released so as to permit the bracket to move in such a way so that the script prompter can move into the closed position. In another form, the clamp may be in two parts which slide and telescope relative to each other to permit the script prompter to close. These are only examples, and it is not intended that the invention should be limited by the type of bracket 112 used, but only that the bracket should be effective in holding the script tray 84 in an elevated and/or substantially horizontal position.

With reference to FIG. 9, this shows a front view of the script prompter 80 shown in FIG. 7. FIG. 9 shows a front edge 122 of the script tray 84, hingedly connected to the mirror 82. The front surface 84 of the mirror is visible.

It will, importantly, be seen from the front view of the script prompter 80 shown in FIG. 9 that the mirror is not shaped rectangularly, but rather is in the form of a frustum. The inner edge 96 of the mirror 82 is of smaller dimension, but substantially parallel to, the outer edge 124 thereof. The side edges 114a and 114b taper outwardly from the inner edge 96 towards the outer edge 124. The frustum shaped mirror is of significant assistance to a person reading text off the script prompter since it enables such person to stand to the left or right of center of the camera, but still be able to read the text. The widening configuration of the mirror thus permits the reader to stand in varying positions with respect to the camera, and the text mounted on the script tray will still be readable, due to the wider dimensions of the mirror as it approaches the outer edge 124.

Figure 11:
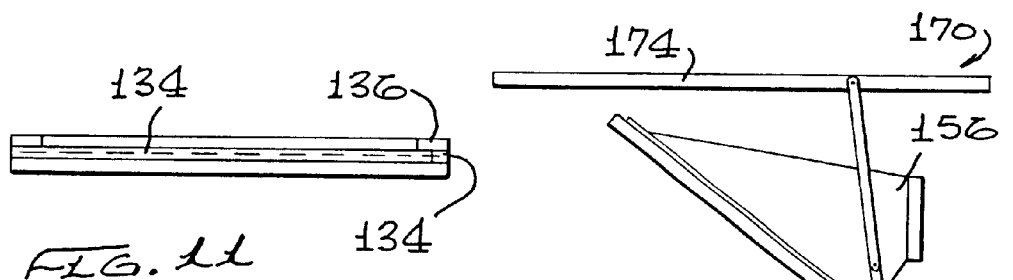
FIG. 11 is a side view of a portion of the script prompt device shown in FIG. 10 of the drawings.

FIG. 10 of the drawings shows a top view of the script prompter 80 shown in FIG. 7, including the mirror 82 and the script prompter 84. The hinge 94 can be seen by means of which the script tray 84 and the mirror 82 are connected to each other. Shown in FIG. 10, and also with reference to FIG. 11, is a text sheet frame, indicated generally by the reference numeral 126. The frame 126 has one long arm 128, and two short arms 130 and 132. Each of the arms 128, 130 and 132 has a connector strip 134 (also shown in FIG. 11) which is attached to the upper surface 92 of the script tray 84. (It can also attach to the side edges or other suitable parts of the script tray.) Each arm 128, 130 and 132 also comprises an overhang section 136, which is spaced by a short distance above the script tray 84. One side edge 138 of the script tray 84 is open, and a page 140 can be slidably inserted, as clearly shown in FIG. 11, under the overhang portions 136 of each of the arms 128, 130 and 132, which will keep the page 140 in position, but allow it to be easily removed and replaced through the open side edge 138. The frame 126 is of particular usefulness when outside conditions are slightly windy, and a page 140 sitting on top of the upper surface 92 of the script tray 84, without anything to keep it in place, can easily be blown away.

Figure 12:
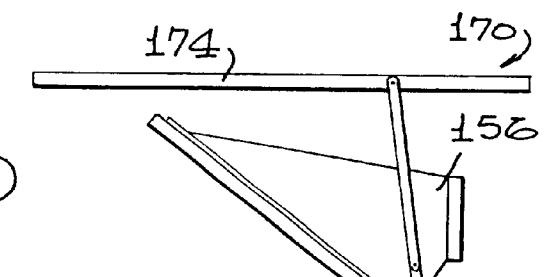
FIG. 12 is a side view of a further embodiment of the invention including certain accessories.

With reference to FIG. 12 of the drawings, there is shown a script prompter of the invention comprising, in purely schematic form, the script tray 150, connected by a hinge 152 to the mirror 154. The hood 156 or housing is shown schematically, and is connected to the lens of a camera in a manner described with respect to the embodiments above. In FIG. 12, the tray 150 has therebelow a first roller 158 and a second roller 160, each of which has a handle 162. A continuous sheet of text 164 extends from the first roller 158 over the upper surface 166 of the tray 150, and onto the second roller 160. The sheet of text 164 can be scrolled over the upper surface 166 and between the rollers, and this may take place either manually by rotation of the handles 162, or by fixing a small motor (not shown) of variable speed to the script prompt device to automatically scroll through the text. A disadvantage, however, of a motorized version of rollers is the possible additional weight (although very small motors can be attached), as well as any sound or noises produced by the motor which may interfere with recording.

FIG. 12 also shows the additional feature of a French flag 170, which may be releasably and/or collapsibly mounted to the camera to shade the script prompt device from the sun. The French flag comprises a post or support 172 upon which is mounted a canopy portion 174, the position of which may be adjustable to meet specific conditions.

Figure 13:
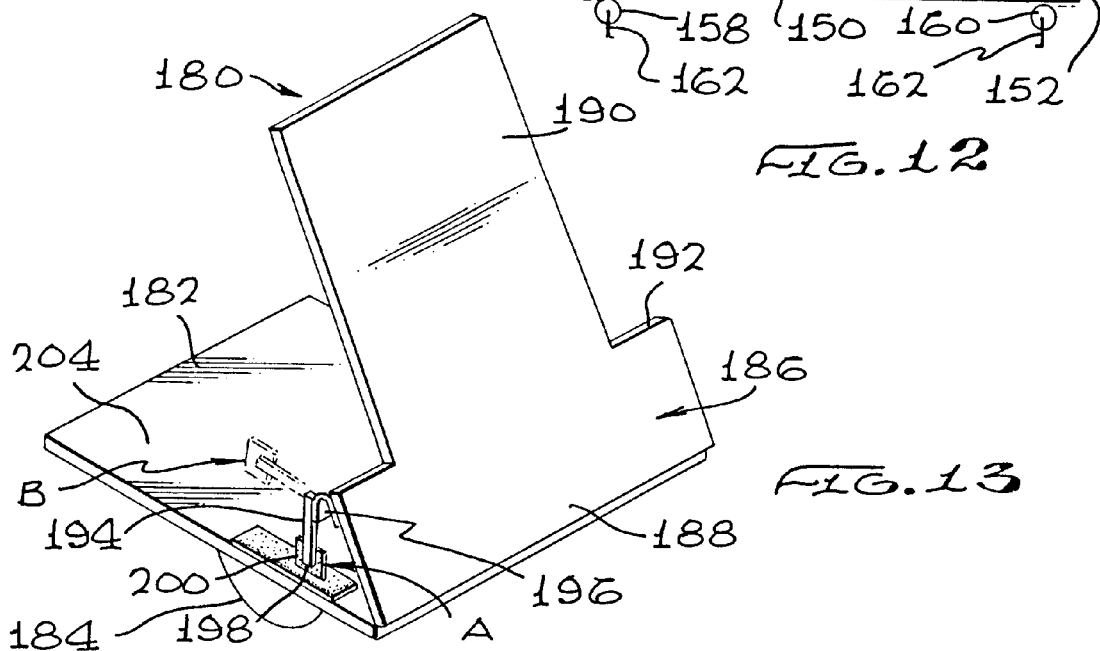
FIG. 13 is a perspective view of a script prompt device of the invention showing an adjustable bracket for holding the device in the open position.

FIG. 13 illustrates a script prompt device 180 of the invention having a mirror 182, hood 184 and script tray 186, all of which can be assembled in the forms and configurations described above. The script tray 186 has a wider portion 188 and a narrower portion 190 separated from each other by a step 192. A rigid brace 194 is connected to the script tray 186 near the step 192 by means of a flexible band 196. The band 196 may be glued to both the brace 194 as well as script tray 186. The brace 194 is free to pivot and move about the band 196 between positions A and B shown in FIG. 13. Position B is shown in phantom lines. The end 198 of the brace 194 has a piece of Velcro strip 200 around it. There is also a Velcro strip 202 attached to the edge 204 of the mirror 182. The Velcro strip 200 on the brace 194 releasably adheres to the Velcro strip 202 on the mirror 182, and is sufficiently stable to keep the script tray 186 and mirror 182 open or apart. By adhering the Velcro Strip 200 on the brace 194 to different locations on the Velcro strip 202 on the mirror 182, the angle between the script tray and mirror can be easily varied or adjusted in very small increments to suit the particular circumstances. When it is desired to compact or fold the script prompt device, the brace 194 is simply lifted off the Velcro strip 202 on the mirror 182 and pivoted into the position B which allows the device to collapse.

In many embodiments, the script prompter of the invention may weigh less than one pound and up to about two pounds, as compared to existing prompters which can weigh as much as 25 pounds and up to 75 pounds. Set up time is also substantially reduced, since the prompter of the invention can be attached to a lens of a camera in seconds as opposed to more cumbersome existing prompters where up to 45 minutes to an hour may be required to assemble the tripods, supports, shelves and other structures necessary for the stable operation of the heavier devices. Importantly, set up of the invention can be achieved without the need for an operator or technician. It will also be clearly apparent that the costs of a prompter in accordance with the invention has several orders of magnitude less expensive than conventional devices.

The invention is not limited to the precise details described above. For example, the script tray need not be mounted in a position to correspond to one above or below the level of the lens in a horizontal plane. The script prompter can be constructed so as to have the script tray and/or mirror in any convenient orientation and/or angle relative to the lens.

What is claimed is:

1. A script prompt device for attachment to a lens of a camera, the device comprising:
   a two-way mirror having a front surface and a rear surface;
   a hood having edges, the hood being mounted on the rear surface of the mirror by connecting the edges of the hood to the rear surface of the mirror thereby defining a substantially closed chamber through which light can pass to and from the lens of the camera;
   a connecting member on the hood for connecting the script prompt device to the lens of the camera;

a script tray member attached to the mirror and movable relative thereto between an open position where the script tray member is angled with respect to the mirror and a substantially closed position where the script tray member and mirror lie substantially adjacent to each other, wherein text located on or in the script tray member when in the open position is reflected in the mirror so as to be visible to a person viewed through the lens.

2. A script prompt device as claimed in claim 1 wherein the mirror is comprised of a plastics material.

3. A script prompt device as claimed in claim 1 wherein the mirror has inner and outer ends, and the script tray member has inner and outer ends, the inner end of the mirror being connected to the inner end of the script tray member so that the script tray, when in the open position, is below the mirror.

4. A script prompt device as claimed in claim 1 wherein the mirror has inner and outer ends, and the script tray member has inner and outer ends, the inner end of the mirror being connected to the inner end of the script tray member so that the script tray, when in the open position, is above the mirror.

5. A script prompt device as claimed in claim 1 wherein the hood covers a portion of the rear surface of the mirror, the remaining rear surface of the mirror having an opaque coating thereon.

6. A script prompt device as claimed in claim 1 wherein the connecting member comprises a lens ring on the hood, the lens ring being dimensioned so as to fit onto and attach to the lens of the camera.

7. A script prompt device as claimed in claim 6 wherein the lens ring further comprises a threaded aperture therein, the threaded aperture receiving a threaded shaft of a bolt, the bolt being adjustable within the threaded aperture to facilitate engagement between the lens ring and the lens of the camera.

8. A script prompt device as claimed in claim 1 wherein the script tray member is rectangular in shape, and sized so as to receive a sheet of text thereon, the mirror being of substantially the same size and shape as the script tray member.

9. A script prompt device as claimed in claim 1 wherein the script tray member is substantially rectangular in shape, and the mirror is substantially frustum shaped, the mirror being narrow at an end thereof which attaches to the script tray member and widening towards an outer end thereof.

10. A script prompt device as claimed in claim 3 further comprising a limit bracket extending between the mirror and the script tray member, the limit bracket being dimensioned so as to hold the script tray member and mirror at a predetermined angle with respect to each other when in the open position.

11. A script prompt device as claimed in claim 10 wherein the angle between the mirror and script prompt device is about 40° to about 60°.

12. A script prompt device as claimed in claim 4 further comprising a support bracket located between the mirror and the script tray member for supporting the script tray member in the open position such that the mirror and script tray member are at a predetermined angle with respect to each other.

13. A script prompt device as claimed in claim 12 wherein the support bracket is adjustable to permit the angle between the mirror and script tray member, when in the open position, to be varied.

14. A script prompt device as claimed in claim 4 wherein the mirror and the script tray member are connected to each other by a hinge.

15. A script prompt device as claimed in claim 14 wherein the hinge is adjustable between a loosened and a tightened position, the angle between the mirror and the script tray member being adjustable when in the loosened position of the hinge, and substantially fixed when in the tightened position of the hinge.

16. A script prompt device as claimed in claim 14 wherein the hinge comprises a friction hinge permitting opening and closing movement between the mirror and the script tray member upon application of an external force, but sufficient to hold the mirror and script tray member fixed with respect to each other when no external force is applied.

17. A script prompt device as claimed in claim 1 wherein the script tray member comprises a frame along at least a periphery thereof wherein text may be located and held in position.

18. A script prompt device as claimed in claim 1 wherein the hood comprises a peripheral rim attached to the rear surface of the mirror and a housing extending from the peripheral rim and away from the rear surface of the mirror, the housing and mirror defining the chamber, wherein the connecting member is located on the housing at a position thereof remote from the peripheral rim.

19. A script prompt device as claimed in claim 1 wherein the hood is comprised of light weight plastics material which is impervious to light.

20. A script prompt device as claimed in claim 4 wherein the script tray member is translucent and the text is located on an upper surface thereof.

21. A script prompt device as claimed in claim 1 comprising a text feed device and a text take-up device associated with the script tray member, wherein a continuous sheet of text can be scrolled over the script tray member by operation of the feed and take-up devices.

22. A script prompt device for attachment to a lens of a camera, the device comprising:

a two-way mirror having a front surface and a rear surface;

a hood having edges, the hood being mounted along at least a portion of its edges on the rear surface of the mirror and defining therewith a chamber through which light can pass to and from the lens of the camera;

a connecting member on the hood for connecting the script prompt device to the lens of the camera;

a script tray member attached to the mirror and angled with respect to the mirror such that text located on or in the script tray member is reflected in the mirror so as to be visible to a person viewed through the lens.

23. A method of displaying text script to a person located in front of a camera having a lens, the method comprising:

attaching a two way mirror to a hood and attaching the hood to the lens or adjacent component of a camera, connecting a script tray to the mirror so as to be fully supported thereby, orienting the script tray relative to the mirror so that text located on or in the script tray member is reflected in the mirror to be visible to the person viewed through the lens.

24. A method as claimed in claim 23 wherein the mirror is releasably attached to the lens.

* * * * *